United States Patent [19]
Stanko et al.

[11] Patent Number: 6,047,926
[45] Date of Patent: Apr. 11, 2000

[54] HYBRID DEICING SYSTEM AND METHOD OF OPERATION

[75] Inventors: John Stanko, Redondo Beach; Lowell Pearson, Hermosa Beach, both of Calif.

[73] Assignee: AlliedSignal Inc., Morristown, N.J.

[21] Appl. No.: 08/877,272

[22] Filed: Jun. 17, 1997

Related U.S. Application Data

[60] Provisional application No. 60/022,508, Jun. 28, 1996.

[51] Int. Cl.[7] .......................... B64D 15/00; F23D 11/10; B08B 3/00
[52] U.S. Cl. ................... 244/134 R; 244/134 C; 239/423; 134/102.2; 134/123
[58] Field of Search ........................... 244/134 R, 134 C; 239/422, 423, 135; 134/102.1, 102.2, 123

[56] References Cited

U.S. PATENT DOCUMENTS

| | | |
|---|---|---|
| 1,868,468 | 7/1932 | Thompson . |
| 1,943,062 | 1/1934 | Driscoll . |
| 2,249,940 | 7/1941 | Bulloch . |
| 2,312,187 | 2/1943 | Patterson . |
| 2,390,093 | 12/1945 | Garrison . |
| 2,406,473 | 8/1946 | Palmatier . |
| 2,422,746 | 6/1947 | Patterson . |
| 2,457,031 | 12/1948 | Campbell et al. . |
| 2,832,528 | 4/1958 | Spears, Jr. . |
| 2,938,509 | 5/1960 | Carbonero . |
| 3,086,713 | 4/1963 | Moldenhauer . |
| 3,101,175 | 8/1963 | Brown, Jr. . |
| 3,160,347 | 12/1964 | Ackley et al. . |
| 3,243,123 | 3/1966 | Inghram et al. . |
| 3,485,176 | 12/1969 | Telford et al. . |
| 3,533,395 | 10/1970 | Yaste . |
| 3,602,211 | 8/1971 | Charman . |
| 3,612,075 | 10/1971 | Cook . |
| 3,684,186 | 8/1972 | Helmrich ........................ 239/422 |
| 3,777,983 | 12/1973 | Hibbins ........................... 239/422 |
| 3,835,498 | 9/1974 | Arato . |
| 4,032,090 | 6/1977 | Thornton-Trump . |
| 4,073,437 | 2/1978 | Thornton-Trump . |
| 4,118,151 | 10/1978 | Murakami et al. . |
| 4,191,348 | 3/1980 | Holwerda . |
| 4,221,339 | 9/1980 | Yoshikawa ....................... 239/422 |

(List continued on next page.)

*Primary Examiner*—Charles T. Jordan
*Assistant Examiner*—Theresa M. Wesson
*Attorney, Agent, or Firm*—Robert Desmond, Esq.

[57] ABSTRACT

This invention overcomes the disadvantage of the prior systems and produces a high velocity specially formed and constituted pressure aerodynamic stream system for efficiently and effectively removing ice from an aircraft. The specially formed stream system includes a stream within a stream, wherein a deicing fluid such a glycol is entrained within and encased by a surrounding jacket of entraining fluid such as air. This deicing is now known as coaxial stream/stream within a stream deicing. The special nozzle allows the stream to maintain fluid separation over its flight path so that aircraft contact is made by to be known as coaxial stream/stream within a stream deicing. The coaxial stream/stream within a stream deicing is further enhanced by pressurizing the stream to deliver the stream as a high pressure, high velocity stream to improve the aerodynamic sweeping action of the airstream.

27 Claims, 5 Drawing Sheets

U.S. PATENT DOCUMENTS

| | | |
|---|---|---|
| 4,225,086 | 9/1980 | Sandell . |
| 4,333,607 | 6/1982 | Mueller et al. . |
| 4,378,755 | 4/1983 | Magnusson et al. . |
| 4,634,084 | 1/1987 | Magnusson . |
| 4,652,025 | 3/1987 | Conroy, Sr. . |
| 4,723,733 | 2/1988 | McClinchy .......................... 244/134 C |
| 4,741,499 | 5/1988 | Rudolph et al. . |
| 4,826,107 | 5/1989 | Thornton-Trump . |
| 4,842,005 | 6/1989 | Hope et al. . |
| 4,915,300 | 4/1990 | Ryan . |
| 4,932,121 | 6/1990 | Jestadt et al. . |
| 4,986,497 | 1/1991 | Susko . |
| 5,028,017 | 7/1991 | Simmons et al. . |
| 5,096,145 | 3/1992 | Phillips et al. . |
| 5,104,068 | 4/1992 | Krilla et al. . |
| 5,134,380 | 7/1992 | Jonas . |
| 5,165,606 | 11/1992 | Pelet . |
| 5,244,168 | 9/1993 | Williams . |
| 5,282,590 | 2/1994 | Zwick ................ 244/134 C |
| 5,337,961 | 8/1994 | Branbani et al. ........................ 239/422 |
| 5,454,532 | 10/1995 | Whitmire ............................ 244/134 R |
| 5,520,331 | 5/1996 | Wolfe . |
| 5,632,072 | 5/1997 | Simon et al. ........................... 26/69 R |
| 5,730,806 | 3/1998 | Caimi et al. ......................... 134/102.1 |
| 5,746,396 | 5/1998 | Thorton-Trump .................. 244/134 R |
| 5,779,158 | 7/1998 | Baker ...................... 239/422 |
| 5,785,721 | 7/1998 | Brooker ................... 239/422 |

HYBRID DEICING SYSTEM AND METHOD OF OPERATION

RELATED APPLICATION

This application claims the benefit of and priority to earlier filed U.S. provisional application for a Glycol Air Deicing System Ser. No. 60/022,508 filed Jun. 28, 1996.

FIELD OF INVENTION

This invention is related to a system for deicing aircraft and more particularly to a glycol/air coaxial stream deicing system wherein glycol and forced air are applied as a specially formed glycol stream within a forced air stream. The special stream is charged to hydrodynamically dislodge and remove ice or other frozen deposits from the aircraft.

BACKGROUND

Prior forced air deicing systems inject the glycol in an air stream air causing the glycol to be atomized and dispersed in the air. Such streams lack the cleaning capacity to dislodge and remove ice from aircraft wings.

Conventional aircraft deicing systems consist of ground or truck mounted spray systems which apply hot (180° F.) deicing fluid (a mixture of glycol and water) at rates up to 60 gpm to the aircraft surfaces. This thermal process is very effective in quickly melting the snow or ice from these surfaces, i.e. wings, etc. However, glycol is expensive and toxic creating significant economic and waste management problems for airline and airport operators. The life cycle cost of deicing glycol (i.e. Type I ethylene or propylene glycol) includes costs associated with its buying, storing, handling, heating, applying, collecting and reprocessing or disposal. Various deicing systems using little or no glycol have been tried and to date these systems have demonstrated limited effectiveness. Therefore, they have not gained acceptance by commercial deicing operators.

Ground deicing of aircraft is an important step in preparing aircraft for safe flight during snow, ice and frost weather conditions. Accumulation of these winter products on aircraft surfaces (wings, tail and rudder) disturbs the aerodynamic performance of these surfaces creating unstable flight conditions. While conventional hot deicing fluid washdown of aircraft is very effective in removing these accumulations, glycol is expensive and toxic. Furthermore, the deicing process takes time which causes flight delays during the winter months. This combination of cost, waste management and flight delays creates a significant economic burden for the airlines during winter operations. Therefore, a deicing process that is efficient, i.e. sharply reduces glycol usage and deicing cycle time, is in high demand by the airline industry.

Conventional aircraft deicing by hot deicing fluid (Type I) washdown from ground or mobile boom systems has been in use for decades with no basic changes to this technology other than refinements to the deicing fluid heating and application systems. Some of the patents covering conventional deicing and its refinements are as follows U.S. Pat. No. 3,243,123, to D. M. Ingraham, et. al., issued Mar. 29, 1966; U.S. Pat. No. 4,073,437 to Thornton-Trump, issued Feb. 14, 1978; U.S. Pat. No. 4,826,107 to Thornton-Trump, issued May 2, 1989 and U.S. Pat. No. 5,028,017, to Simmons, et al., issued Jul. 2, 1991. Other publications describe various deicing systems, (some of which are believed to have been tested) to improve the deicing process, either by reducing or eliminating the use of glycol, or by applying glycol in a more efficient manner such that the glycol usage is reduced for instance: U.S. Pat. No. 5,244,168 to Williams, issued Sep. 14, 1993 for A Methodology And Apparatus For Forced Air Aircraft Deicing and U.S. Pat. No. 5,104,068 to Krilla et al., issued Apr. 14, 1992

Forced air deicing ("hot air blasts") has been used by the U.S. Air Force for decades. At Air Force bases such as Elmendorf AFB in Alaska, operators use deicing trucks that have an add-on forced air system. Landoll is one company that modifies deicer trucks with forced air add-on for Air Force use. These Landoll add-on systems, use air from a Garrett (now Allied signal) APU that is plumbed to a second (non gylcol carrying) nozzle located along with the conventional deicing fluid nozzle(s) at a boom basket. Forced air is used to remove much of the snow from military aircraft followed by conventional fluid deicing. This process, which extends deicing cycle time, is viable for the Air Force because they are typically not constrained by strict time schedules, like commercial airlines, and glycol usage is reduced.

Deicing fluid entrained in air has been know for a number of years, see for instance U.S. Pat. 2,482,107 "Prevention of Ice Formation in Air Intakes on Aircraft and Other Fast Moving Vehicles," (1949) and Palmatier, "Fan Deicing or Anti-Icing Means", U.S. Pat. No. 2,406,473 (1946).

Figure 1:
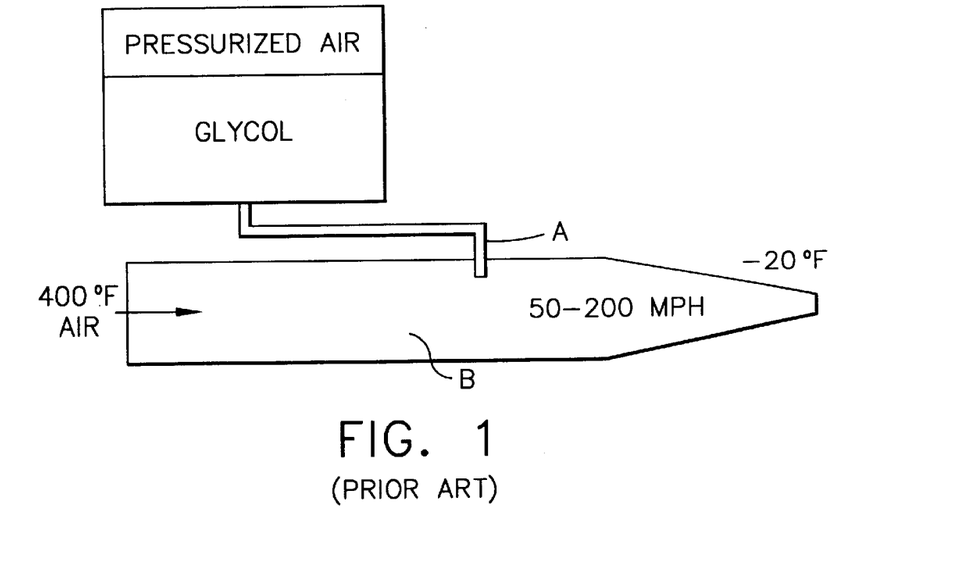
FIG. 1 is a cross sectional illustration of a prior glycol and forced air deicing system showing glycol injection at a right angle to the air stream.

Referring now to FIG. 1, that shows an illustration of prior art forced air deicing system of the type disclosed in U.S. Pat. No. 5,244,168, that injects glycol A at right angles to the primary flow axis of an airstream B , generally producing what is described in that patent as "a well-dispersed atomized spray pattern" (col 7 line 35) or a "spray pattern of a high speed colloidal suspension of deicing fluid in air" (claim 1, lines 21-22). This patent also requires the uses of a "plurality of sources of deicing fluid." (see col 2, line 34 col line 32).

Various airline operators have indicated that glycol injected at a right angle to the primary axis of the airstream, as is shown in FIG. 1, reduces the effectiveness of forced air deicing. The glycol mixes and atomizes in the airstream. The energy transfer process associated with the mixing and atomizing reduces the kinetic energy of the airstream which reduces the effectiveness of the air stream/glycol mixture to dislodge snow and ice that is frozen to or adhered to an aircraft. Thus, this atomization process reduces the effectiveness of the airstream in breaking loose snow and ice that is frozen to or adhered to an aircraft surface and also reduces the effectiveness of the airstream in moving heavy, wet snow. In addition, the mixture of atomized glycol and high velocity air adds more wetness to the snow further inhibiting the removal of wet snow.

Another novel deicing technique developed by InfraTek Radiant Energy Corporation uses gas-fired infra-red heaters built into the interior structure of a large prefab type hangar to melt ice from the aircraft surfaces. Two fundamental problems have surfaced with this deicing process. First, the frequency of the infra red heaters is such that snow melts slowly extending the deicing cycle time. Second, testing to date shows that melting ice from the upper surfaces of the aircraft often re-freezes on the lower surfaces not exposed to the infra-red rays.

U.S. Pat. No. 5,104,068 Krilla et al. for a "Apparatus and Method for De-Icing and Anti-Icing (and/or Cleaning and Rising Aircraft)" describes an apparatus for both de-icing and anti-icing an aircraft in one "pass". The apparatus consists of articulated booms on each side of the aircraft to be processed. These booms are such that they extend over the entire length of each wing and each has two series of nozzles. One set is for dispensing a deicing fluid mixture and the other set of nozzles dispenses anti-icing fluid. There is also a set of booms underneath the aircraft for processing the lower aircraft surfaces. The patent also describes the use of different mixtures of pressurized air, water and glycol (Type I) with the mixture varied in accordance with the particular weather conditions. The apparatus and process described above are commercially known by the name "Whisper Wash" expected to be field demonstrated during the winter of 1996-7. Benefits expected to be realized presumably include, reduced glycol usage and reduced de-ice/anti-ice cycle time.

SUMMARY OF THE INVENTION

This invention overcomes the disadvantage of the prior systems and provides a new hybrid deicing system that produces high velocity specially formed coaxial streams of Type I glycol and water (i.e., deicing fluid) and air for efficiently and effectively removing ice from an aircraft. This invention ("hybrid deicing"), utilizing two fluid flow technologies and a unique coaxial nozzle, yields an efficient, stand-alone deicing system, i.e. a complete deicing system that reduces glycol usage and deicing cycle time. The new process consists of an inner high velocity stream of glycol surrounded by an outer stream of high velocity air. These two independent, coaxial streams work in concert to deice the aircraft surfaces. Laboratory tests have validated that "hybrid deicing" can quickly and safely remove snow and ice frozen to a simulated aircraft surface. These tests indicate that deicing glycol usage can be reduced to 10% or less relative to conventional usage thereby providing the deicing operator with significant economic and waste management benefits. It is estimated hybrid deicing will reduce conventional deicing cycle time, in many deicing situations, by 10% or more providing an additional benefit to the operator. The specially formed stream includes a stream within a stream, wherein a deicing fluid such as glycol/water mixture is entrained within and encased by a surrounding jacket of entraining fluid such air. Therefore the unique coaxial nozzle produces two essentially independent streams of Type I glycol fluid and air, both streams exiting the nozzle at high and substantially equal velocities in the range of 600–800 mph. The precise velocity of the streams depends on the upstream pressures and temperatures of the fluids.

This combination of a high velocity coaxial stream of glycol within a stream of air hydrodynamically and thermally removes adhered ice, all types of freezing rain and snow. Further the surrounding sheath of forced air reduces the fluid energy and momentum loss of the inner deicing fluid and increases the effective snow/ice removal range (distance from the nozzle exit ) of the combined streams.

This invention, utilizing high pressure glycol that is coaxially injected into a high velocity airstream, will de-ice aircraft as effectively as the conventional hot glycol wash method but with glycol application rates reduced to 10% or less of conventional rates. Consequently, this new deicing system significantly reduces deicing costs and the impact on the environment.

This combination of high velocity coaxial stream of glycol within a stream of air hydrodynamically and thermally remove adhere ice, and light, wet and heavy snow.

This invention, utilizing high pressure glycol that is coaxially injected into a high velocity airstream and or stream within a stream high pressured injection, will de-ice aircraft as effectively as the conventional hot glycol wash method but with glycol application rates reduced to 10% or less of conventional rates. Consequently, this new deicing system significantly reduces conventional deicing costs and the impact on the environment.

BRIEF DESCRIPTION OF THE DRAWINGS

The invention will become more readily apparent from the following description of preferred embodiments thereof, illustrated, by way of examples, in the accompanying drawings, in which.

DETAILED DESCRIPTION OF PREFERRED EMBODIMENTS

Figure 2:
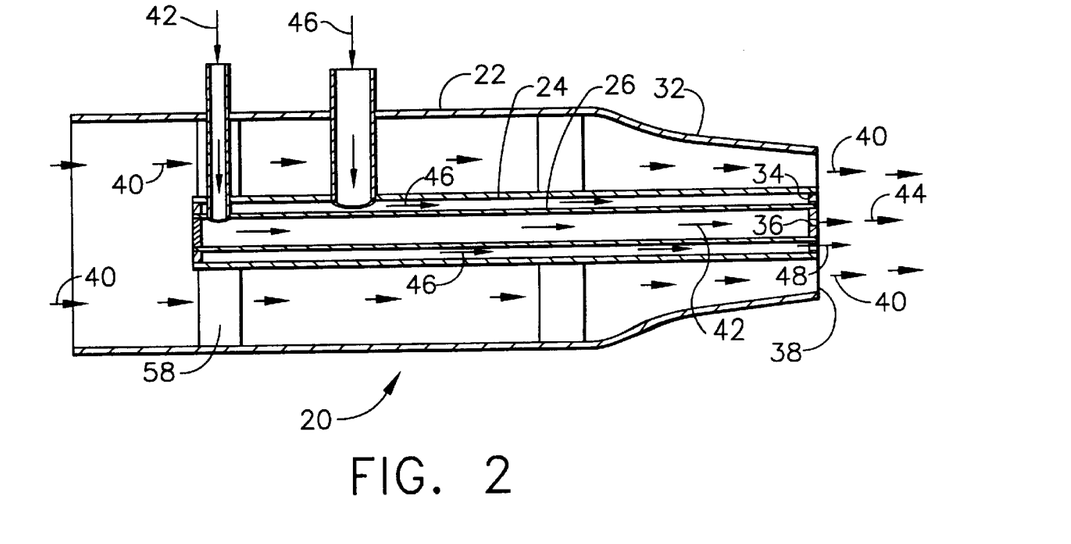
FIG. 2 is an illustration of glycol forced air deicing system in accordance with the present invention showing coaxial glycol and injection.

Referring now to FIG. 2, the new stand-alone ground based hybrid deicing system 10 of the present invention, (shown in detail in FIG. 7), utilizes a specially constructed coaxial nozzle assembly 20 that simultaneously delivers two independent, high velocity deicing streams. Preferably, a deicing fluid stream is encased within a high velocity airstream. The nozzle preferably has a 0.060 inch diameter carbide jetting orifice that produces a conical shaped jet.

The coaxial nozzle assembly 20 is specially designed to meld two fluid flow technologies, conversion of subsonic airflow to sonic or near sonic airflow and high pressure liquid jetting to create two independent streams that are effective for deicing aircraft. Coaxial nozzle assembly has two concentric pipes along the centerline of the assembly with low and high flow deicing fluid nozzles and a converging/air nozzle.

The coaxial nozzle assembly 20 comprises three concentric cylinders 22, 24, and 26 and three nozzles 32, 34 and 36. This cylindrical arrangement provides two different flow passages for the the deicing fluid and a single passage for the forced air. The outer cylinder 22, with a 3.5 inch internal diameter, has a converging/nozzle 32 at one end 38 where pressurized air 40 exits. Along the centerline of this cylindrical air nozzle assembly 20 are two concentric pipes 24 and 26. The inner pipe 26 delivers high pressure (up to 7000 psi) deicing fluid 42 at approximately 6 gpm to a fluid jetting nozzle 36 which produces a high velocity deicing fluid jet 44. The inside of the outer pipe 22 and outside of the inner pipe 26 form an annular passage for low pressure deicing fluid in the pressure range of 150–300 psi. The low pressure deicing fluid preferably exits the coaxial nozzle 20 through an annular array of orifices 34 at approximately 20 gpm in jets 48. The exits of the inner nozzles 34 and 36 are flush with exit of the air nozzle 32.

A key feature of the coaxial nozzle is the compatibility of the exit fluid streams. Pressurized air 40 from a centrifugal compressor (FIG. 7) enters the coaxial nozzle 20 at approximately 100 lb. per minute (ppm). This air 40 exits the coaxial nozzle 20 through the annular region formed by the convergent/nozzle 32 (ASME "long radius" nozzle) and the outer deicing fluid pipe 24.

The ASME nozzle 32 accelerates the air 40 to sonic or near sonic velocity with minimal energy loss. In the low flow mode, high pressure (7000 psi) deicing fluid flows through the inner pipe 26 and exits through a carbide fluid jetting nozzle 36 in a solid conical pattern. The coaxial nozzle design and inlet pressures of the air 40 and deicing fluid 42 (high pressure low flow mode) were selected to achieve equal exit velocities of approximately 600–800 mph for both fluids.

Under most deicing conditions, the maximum flow rate of the deicing fluid 42/44 is only 6 gallons per minute (gpm) relative to conventional deicing with flow rates of 60 gpm or more. Since, in the hybrid deicing process, the deicing fluid stream can be, turned "on" or "off" abruptly by the deicing operator, glycol consumption is further reduced. For example, the deicing operator turns" off the deicing fluid when removing dry or near dry powder snow that is not adhered to the aircraft surface. After deicing under these conditions, the operator can turn "on" the deicing fluid to apply a final overspray of fluid for providing anti-icing holdover time prior to takeoff.

The purpose of the low pressure, high flow deicing fluid feature is to address the fairly infrequent but severe icing conditions that result in the formation of ¼ inch or more of hard ice frozen to the aircraft surfaces. Under these conditions, a deicing process similar to conventional deicing (hot deicing fluid washdown) must be employed, i.e. thermal removal of the ice. The high velocity air flowing around this lower velocity inner stream assists in the snow removal process and also blows away the steam that forms. Therefore, the airstream has an added benefit of helping the operator to better see what he is doing. For hard, thick ice an operator switches the remote valves to direct the deicing fluid to the outer annual flow passage and the annular orifice array. The high pressure pump is sped up so that the deicing fluid delivery is increased from 6 gpm to 20 gpm. Since the 20 gpm deicing fluid 46 now flows through a much larger orifice area, the pressure in the annular flow passage drops to 150–300 psi, hence the low pressure high flow mode of operation.

Therefore, the hybrid deicing process is adjustable on the spot to the specific deicing conditions encountered and all deicing conditions can be efficiently addressed. This adjustment capability maximizes effectiveness of the process and is consistent with the goal of this invention to minimize glycol consumption and waste management. FIG. 2 below shows the side view of the coaxial nozzle exit and the deicing fluid exit points for the two modes of operation using deicing fluid. A third mode of operation uses air only.

Figure 3:
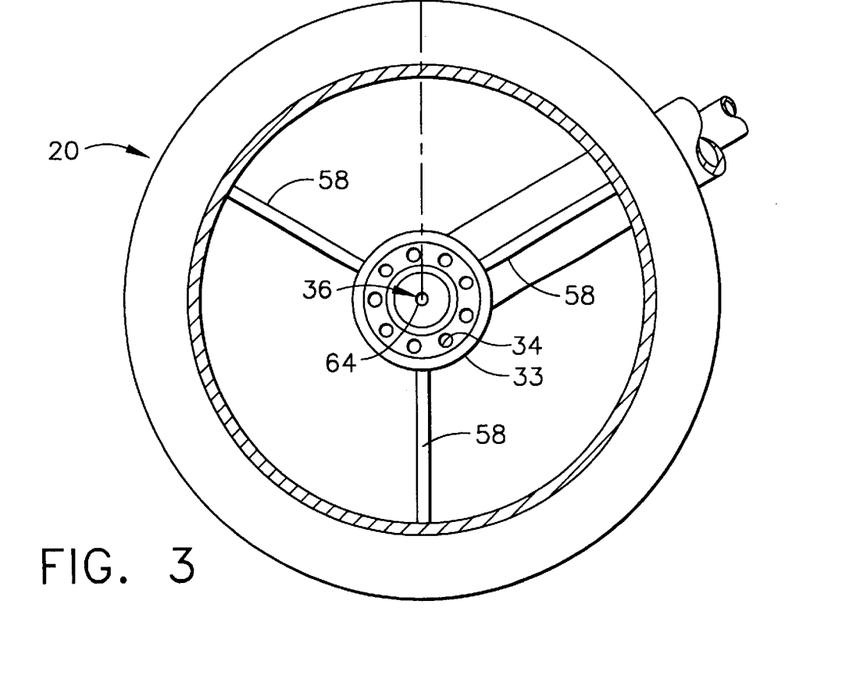
FIG. 3 is an illustration of a coaxial nozzle exit in accordance with the present invention showing coaxial glycol injection.

FIG. 3. is an illustration of a the front view of the coaxial nozzle exit in accordance with the present invention. For most deicing conditions, high velocity low flow deicing fluid 44 is jetted from the center orifice 36 in a conical spray pattern. For hard, thick ice removal, low velocity high flow deicing fluid flows through the annular orifices 34 at a rate of approximately 20 gpm. In both cases, the inner deicing fluid stream 44 or 48 is surrounded by a high velocity outer airstream 40.

Figure 4:
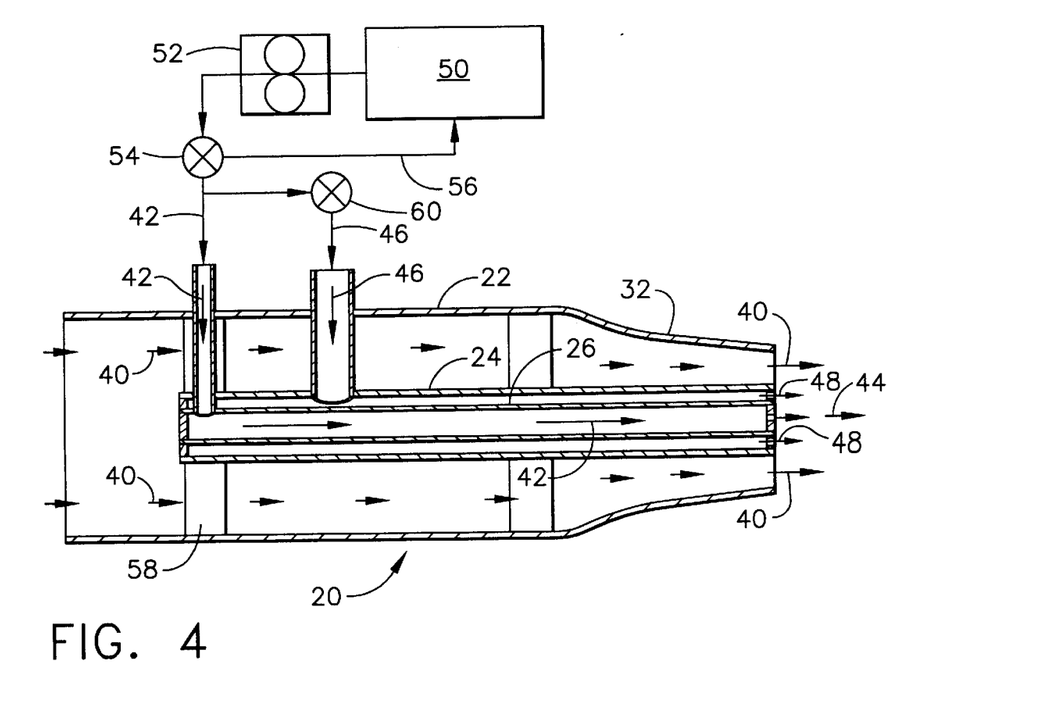
FIG. 4 is an illustration of schematic block diagram of a glycol and forced air deicing system in accordance with the present invention showing coaxial glycol injection.

FIG. 4 is an illustration of a schematic block diagram of a simplified glycol forced air deicing system 10 including deicing fluid tank 50 coupled to a high pressure pump 52. A copressor providing the forced air is not shown. A three way selector valve 54 is coupled to the pump 52 to feedback deicer fluid to the tank 50 through return line 56 or to direct deicing fluids 42 or 46 to the nozzle assembly 20. A diverter valve 60 is connected between the three way valve 54 and the low pressure deicing fluid passage so that when the diverter valve 56 is open a high volume of low pressure deicing fluid 46 flows to the orifices and 34.

The variable speed high pressure pump 52 of the system 10 can be used for low flow (6 gpm) or high flow (20 gpm) operation in which deicing fluid flows coaxial to the airstream producing independent streams of fluids that work in concert and are effective in removing wet snow or snow ice that has adhered to the aircraft surfaces.

A coaxial nozzle assembly 20 (FIG. 2) can be constructed from 3.5 inch diameter stainless steel 22 tubing with a converging/ASME "long radius" nozzle 32 attached to one end. A 24 inch long stainless steel pipe 22, 0.75 inch in diameter, was supported from struts 58 along the centerline of the larger tube 24. A second stainless steel pipe 26 is supported along the centerline of the stainless steel pipe 24. A high pressure jetting nozzle assembly 36 can be screwed into the end of this pipe 26. The nozzle assembly 36 can include a carbide nozzle insert 64 that can be changed to alter the deicing fluid jet pattern for example from fan to solid cone with various dispersion angles.

A system in accordance with the FIG. 4 schematic having a coaxial nozzle 20 and the remote controlled valves 54 and 60 allows an operator of the deicing system to continuously adjust between all three deicing fluid modes or to select one of three deicing fluid flow modes: i) Low flow (6 gpm) for most deicing conditions, ii) High flow (20 gpm) for hard ice removal or iii) Flow "off for air only removal; deicing fluid is bypassed back to deicing fluid tank.

Figure 5:
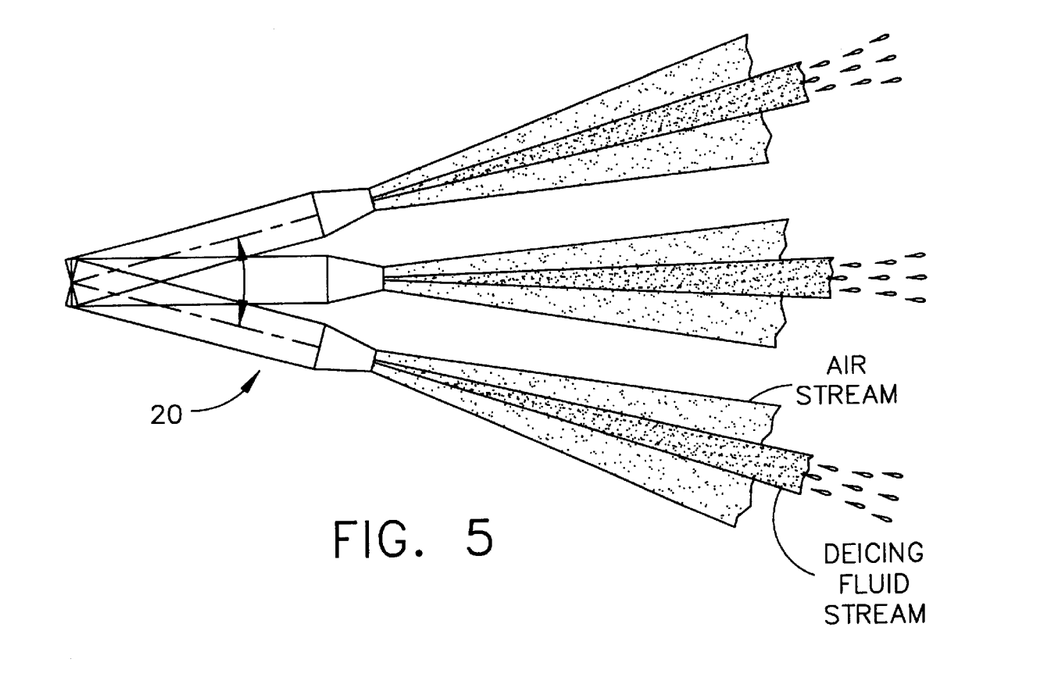
FIG. 5 is an illustration of the sweeping action found to be effective in the use of the present invention.
Figure 8:
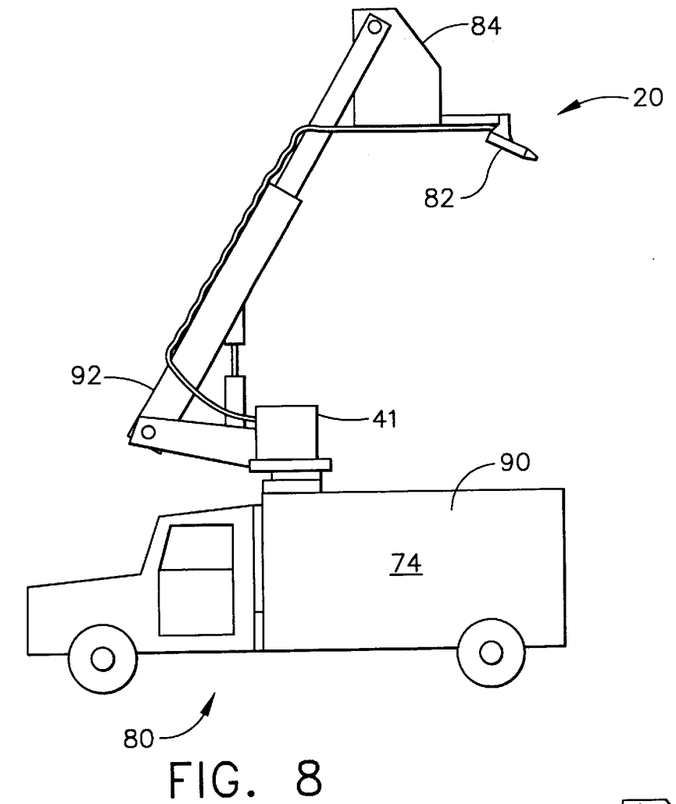
FIG. 8 is an illustration of a truck mounted hybrid deicing system in accordance with the present invention.

FIG. 5 is an illustration of the sweeping action found to be effective in the use of the present invention and shows the coaxial nozzle swinging motion found to be the most effective for removing ice. In an actual working system, the coaxial nozzle swinging motion, using an automatic actuation system 74, can be activated when the deicing fluid 44/48 is called for by for instance depressing the lever of the deicing gun (FIG. 8).

Figure 6A:
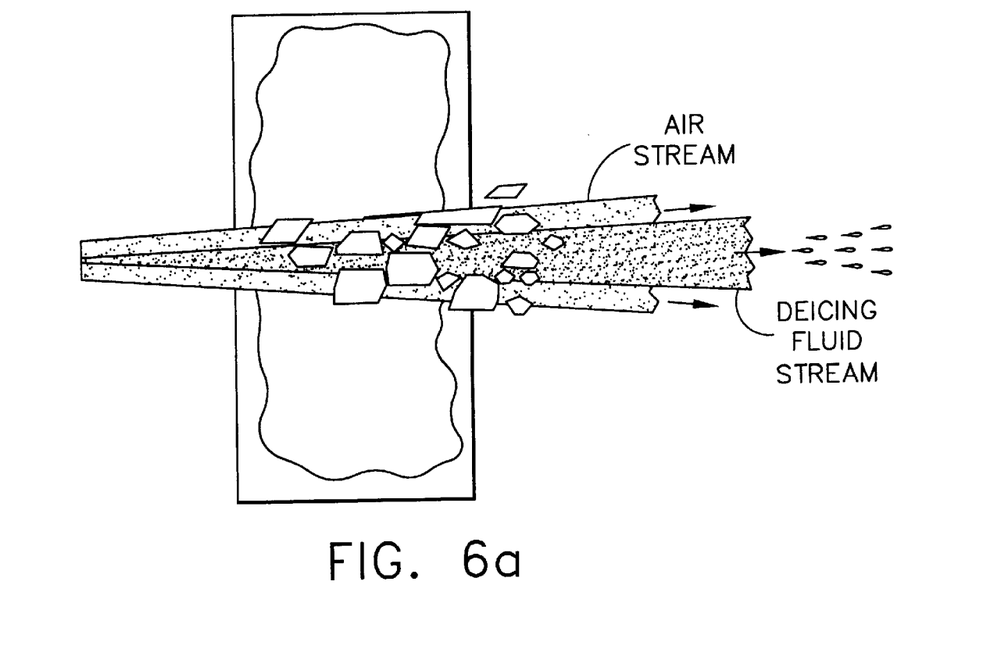
FIGS. 6a and 6b are illustrations of the frozen snow removal process in accordance with the present invention.
Figure 6B:
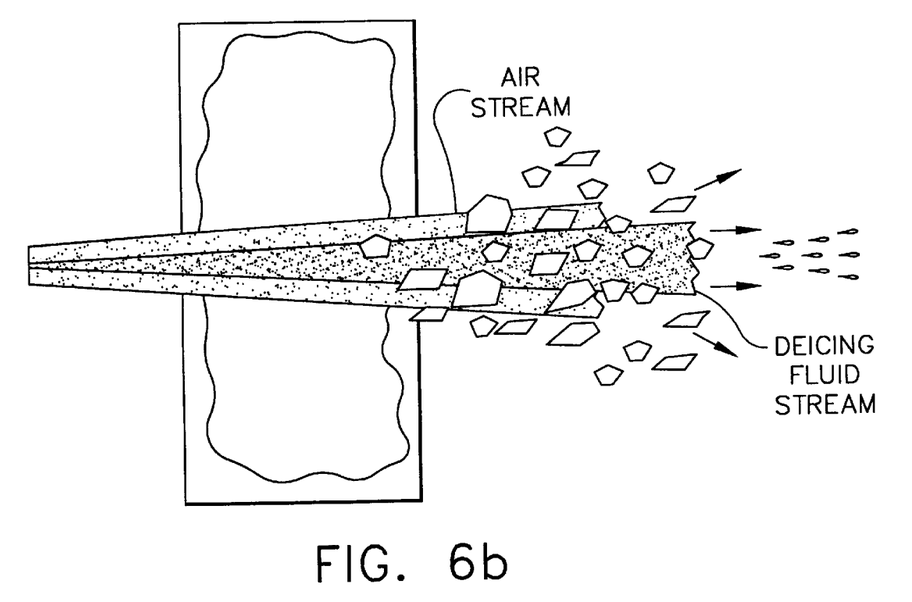

FIGS. 6a and 6b are illustrations of the frozen snow removal process in accordance with the present invention. In FIG. 6a frozen snow is removed by the concentrated energy of the inner deicing fluid stream. In FIG. 6b, both stream work in concert sweep away the loosened frozen snow.

Figure 7:
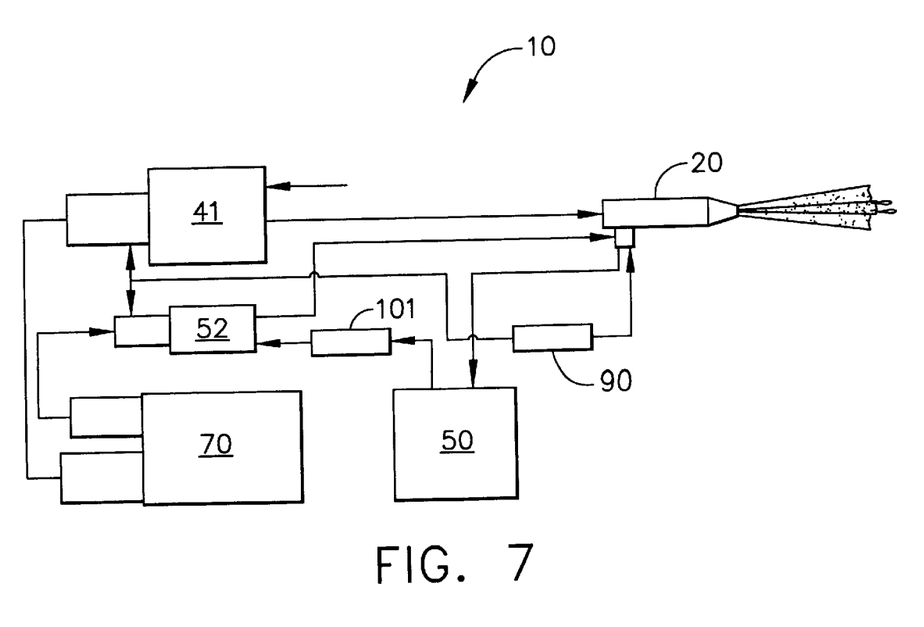
FIG. 7 is an illustration of a hybrid glycol and forced air deicing system in accordance with the present invention.

FIG. 7 is a simplified schematic of a hybrid deicing system 10 in accordance with the present invention. A key element of the hybrid deicing system 10 is the compact air source 41, such as a gear driven centrifugal compressor, manufactured by AlliedSignal as a model P3X compressor. This compressor 41 is unique because of its very high power density, i.e. its high horsepower to low weight ratio. A high speed radial bladed impeller in this compressor produces pressurized air at 100 ppm at a maximum pressure of 29 psig for sea level operation. These characteristics of the compressor are necessary to provide the air flow rate and discharge pressure at high altitude airports such as Denver International, as well as sea level airports, for effective hybrid deicing. The compactness of the machine allows it to be installed at the base of deicing booms to minimize air handling problems associated with air delivery through large diameter hose and pipe.

Referring to FIG. 7, high pressure deicing fluid is produced by a triplex type positive displacement variable speed pump 52 which has sufficient capacity to pump both low flow (6 gpm), high pressure (7000 psi) and high flow (20 gpm), low pressure (300 psi) deicing fluid. Both compressor 41 and high pressure pump 52 are hydraulically driven with the ultimate power source being diesel engine 70.

Figure 9:
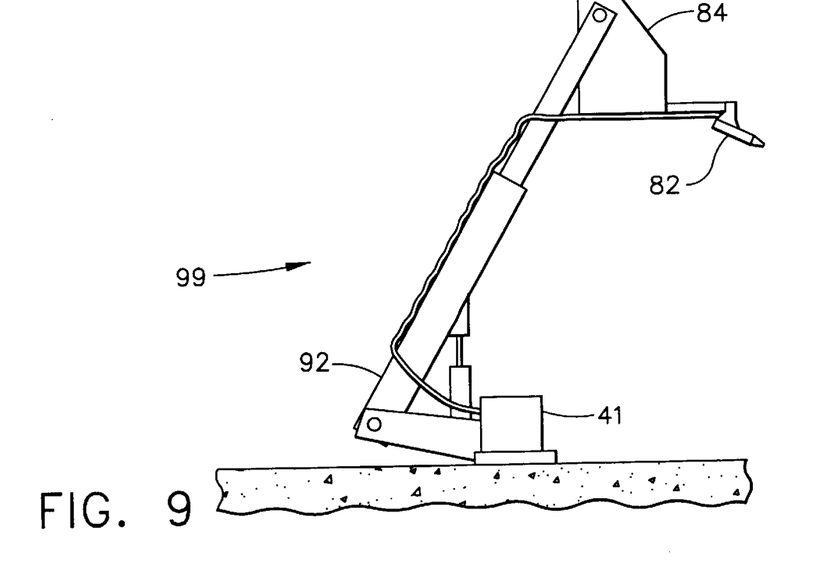
FIG. 9. is an illustration of a stationary boom that can be used with the hybrid deicing system in accordance with the present invention.

FIG. 8 is an illustration of a truck mounted forced air deicing system in accordance with the present invention. FIG. 8 below shows a deicer truck 80 with a hybrid deicing system 10 installed. The equipment shown in this schematic would typically be installed in a deicer truck having a boom 92 (FIG. 8) or a ground mounted boom system 99 (FIG. 9.) such as the Ice Hawk system located at the Pittsburgh Airport. A deicing gun 82 including the coaxial nozzle 20 is located at the boom basket 84 and the air compressor 41 is mounted at the base of the boom 80. A control system 90 directly associated with the deicing process controls the deicing fluid valves (low flow, high flow or "off") and the speeds of the triplex pump 70 and compressor.

FIG. 8 illustrates an important feature of the hybrid deicing system 10, namely the location of the compact air source 41 (the gear driven centrifugal compressor) at the base of the deicing boom 92. This location minimizes air handling problems associated with air delivery through large diameter hose and pipe. A Type II antiicing system for gel coating cleaned aircraft, can also be included on the deicing trucks with the hybrid system 10.

Another feature of hybrid deicing, resulting from its reduced deicing fluid usage, is the greater on station availability of the hybrid deicer truck. Typically, a deicer truck 80 has a 2000 gallon Type I deicing fluid tank 50 that is refilled at the airline's maintenance facility usually far removed from where deicing is done, i.e. at the gate or near the takeoff area. Due to its low usage of deicing fluid, a hybrid deicer truck can deice about 10 times the number of aircraft that a conventional deicing truck can deice.

Conventional aircraft ground deicing systems consist of ground or truck mounted spray systems which apply hot (180° F.) deicing fluid (a mixture of glycol and water) at rates up to 60 gpm to the aircraft surfaces. This thermal process is very effective in quickly melting the snow or ice from these surfaces, i.e. wings, etc. However, glycol is expensive and toxic creating significant economic and waste management problems for airline and airport operators. This invention addresses a lab-tested, stand-alone hybrid deicing system built around a coaxial nozzle. An independent, high energy, low flow deicing fluid stream within a high velocity airstream does much of the work to break loose ice and frozen snow from aircraft surfaces or to move heavy, wet snow. A significant savings to airline operators in reduced glycol usage, greater on station availability of deicer trucks, and reduced waste management problems are the benefits of this new hybrid deicing process.

In operation it has been determined that the combination of compatible high velocity coaxial streams of air and heated deicing fluid can be used to hydrodynamically and thermally remove adhered ice/snow and heavy, wet snow. a deicing fluid (glycol/water mixture) can be heated by a heater 101 and injected in the center of the airstream through a special 0.060 inch diameter jetting orifice at pressures up to 7,000 psi creating a conical shaped inner fluid stream of high velocity fluid which quickly penetrates and breaks loose ice and snow frozen to the aircraft surfaces. The concentrated force of this high velocity fluid stream is very effective in moving heavy, wet snow. The outer sheath of high velocity air then works in concert with the inner stream of deicing fluid to hydrodynamically sweep away the ice and snow.

Hybrid deicing increaser the aerodynamic sweeping action of a high velocity airstream by adding to it an inner stream of a high velocity deicing fluid. This combination of an inner stream of high velocity deicing fluid within an outer stream of high velocity air hydrodynamically and thermally removes adhered ice, wet, light and heavy snow. The glycol is injected in the center of the airstream through a 0.060 inch diameter nozzle orifice at pressures up to 7,000 psi creating a dense and or highly condensed inner core of high velocity fluid which quickly penetrates and breaks loose ice and snow frozen to the aircraft surfaces. The outer sheath of high velocity air then works in concert with the inner stream of glycol (i.e., deicing fluid) to hydrodynamically sweep away the ice and snow. Since the maximum flow rate of the glycol is only 6 gallons per minute (gpm) and the glycol stream can abruptly turned on or off by the deicing operator, glycol consumption is greatly reduced relatively to glycol consumption for conventional deicing. The deicing operator turns on the glycol stream only when required by the deicing conditions, i.e. localized patches adhered ice/snow. Also, the operator can apply a final overspray of glycol after deicing, a conventional practice, for providing anti-icing prior to takeoff.

In summary, the hybrid deicing process produces coaxial streams of high velocity air and glycol that in combination have momentum and kinetic energy that are at least 50% higher than these same characteristics for the prior art fluid "spray pattern" (U.S. Pat. No. 5,244,168). The prior art injects glycol transverse to the fluid "spray pattern" which does not change the momentum, but the kinetic energy is reduced. Fluid "stream within a stream" momentum is the primary mechanism for sweeping away loose snow and ice. Kinetic energy is the mechanism for breaking loose snow and ice that is frozen to the aircraft surfaces. Therefore, ample fluid "stream within a stream or coaxial stream" momentum and kinetic energy are necessary to provide effective deicing under all weather and deicing conditions.

While the sketches, illustrations and detailed descriptions disclosed the particulars, general and specific attributes of the embodiment of the method, apparatus and systems of the invention, it should not be construed nor assumed by anyone and or those skilled in the art that it is not a form or aspects of limitation of the said and described invention. The details are a mere attempt, for the purpose of clarifications and to express ideas, to explain the principles, to aid and guide an individual/s with expertise in the field to visualize the concepts of said invention. As a plurality of modifications and variations of the present invention are probable and possible taking into consideration the disclosure of the sketches, illustrations and detailed descriptions, it should be understood that the citing, teaching and referring to some and all equivalent elements or combinations for achieving substantially the same results may be practiced otherwise than as uniquely and precisely explicated and described.

What is claimed is:

1. A hybrid deicing system for deicing ice or snow covered surfaces comprising:

a first source of pressurized air;

a second source of pressurized deicing fluids;

a co-axial nozzle that can discharge the deicing fluid in a stream, said deicing fluid stream being within and encased by the air in a stream, both streams being of about the same velocity and in excess of 600 mph at a nozzle exit; and a nozzle control for directing the streams toward an ice or snow covered surface to dislodge accumulated ice or snow from the surface.

2. The hybrid deicing system of claim 1 wherein the ice or snow covered surface is an aircraft.

3. The hybrid deicing system of claim 1 wherein the co-axial nozzle includes three concentric passages each with nozzle exits that are substantially co-planar.

4. The hybrid deicing system of claim 1 wherein the co-axial nozzle includes three concentric passages that are substantially concentric about a common center line.

5. The hybrid deicing system of claim 1 wherein the co-axial nozzle comprises an outer passage for pressurized air, a second passage for a first pressurized deicing fluid and a third passage for a second pressurized deicing fluid.

6. The hybrid deicing system of claim 5 wherein glycol flows in the second and third passages and air flows in the first passage.

7. The hybrid deicing system of claim 6 wherein the glycol and air streams exit the co-axial nozzle at approximately the same velocities and as substantially independent streams.

8. The hybrid deicing system of claim 1 wherein the source of deicing fluid is heated.

9. The hybrid deicing system of claim 1 wherein the pressurized air is produced by a centrifugal compressor.

10. The hybrid deicing system of claim 1 wherein the pressurized deicing fluid is produced by a pump.

11. The hybrid deicing system of claim 1 wherein the system can provide deicing fluid flows in the range of 6 gpm @ 7000 psi to 20 gpm @ 300 psi.

12. The hybrid deicing system of claim 1 wherein the system is adapted for usage on a moving vehicle.

13. The hybrid deicing system of claim 12 wherein the vehicle includes a boom with a basket and controls for operating the co-axial nozzle at various heights.

14. The hybrid deicing system of claim 1 wherein the co-axial nozzle has a 0.060 inch diameter carbide orifice and can provide a deicing fluid flow at about 6 gpm and 600 mph exit velocity.

15. The hybrid deicing system of claim 1 wherein the deicing fluid is glycol/water mixture and the deicing fluid and air are simultaneously supplied.

16. The hybrid deicing system of claim 1 wherein the coaxial nozzle provides conversion of subsonic airflow to sonic airflow and high pressure liquid jetting to produce two compatible and coaxial streams of air and deicing fluid at flow rates of 100 ppm and 6 gpm respectively.

17. The pressurized hybrid deicing system of claim 1 the two compatible, yet independent, fluid streams exit the coaxial nozzle at equal velocities of 800 mph.

18. The hybrid deicing system of claim 1 wherein the stream of deicing fluid provides a force necessary to break loose frozen snow and ice from aircraft surfaces and to also move heavy, wet snow and the air then cooperatively operates with this deicing fluid to hydrodynamically sweep away the ice and snow.

19. The hybrid deicing system of claim 1 wherein the co-axial nozzle has two pipes, one concentric to the other, along a centerline of the co-axial nozzle wherein a 7000 psi deicing fluid flows through the inner pipe and exists through a 0.060 inch diameter orifice at 6 gpm and at least 600 mph.

20. The hybrid deicing system of claim 19 wherein a 300 psi deicing fluid flows through an annular passage between the two pipes and exits the co-axial nozzle through an annular array of orifices at 20 gpm.

21. The hybrid deicing system of claim 19 wherein the fluid stream and airstream exiting the co-axial nozzle join with equal velocities.

22. The hybrid deicing system of claim 1 wherein the airstream minimizes dispersion of the deicing fluid stream helping to maintain the concentrated momentum of the deicing fluid stream.

23. The hybrid deicing system of claim 1 wherein the deicing fluid is heated to 180° F. so that the hydrodynamic sweeping action is augmented by thermal removal of ice and snow.

24. The hybrid deicing system of claim 1 further including remotely controlled valves that allow the operator to select any of three deicing operation modes selected from the group comprising: i) low flow (6 gpm), high velocity deicing fluid and air for most deicing conditions, ii) high flow (20 gpm), low velocity deicing fluid and air for hard, thick ice, and iii) high velocity air only for dry snow not adhered to the aircraft surfaces.

25. The hybrid deicing system of claim 1 wherein the pressurized deicing fluid is supplied by a pump which has sufficient capacity to pump fluid at both low flow of approximately 6 gpm, high pressure of approximately 7000 psi and high flow of approximately 20 gpm, low pressure of approximately 300 psi.

26. A hybrid system for deicing aircraft comprising:

a source of glycol based deicing fluid, a high pressure pump for supplying deicing fluid at pressures up to 7000 psi, a centrifugal compressor for producing 100 ppm of pressurized air, and a co-axial nozzle coupled to said supply of pressurized deicing fluid and pressurized air, said co-axial nozzle includes three separate passages, one passage for the pressurized air and two passages for the pressurized deicing fluid.

27. A method for deicing an ice or snow covered surface, comprising the steps of:

providing a first source of pressurized air;

providing a second source of deicing fluid;

providing a third source of deicing fluid;

pressurizing the second source of deicing fluid for supplying a pressurized deicing fluid at 7000 psi;

pressurizing the source of deicing fluid for supplying a pressurized deicing fluid at 300 psi; and coupling a co-axial nozzle to said second and third sources of pressurized deicing fluid and first source of pressurized air for combining deicing fluids from said second and third sources as an independent stream within a stream.

* * * * *